US005978037A

United States Patent [19]

Hilpert et al.

[11] Patent Number: 5,978,037

[45] Date of Patent: Nov. 2, 1999

[54] CIRCUIT FOR DECODING ADDITIONAL INFORMATION IN A COMPOSITE SIGNAL

[75] Inventors: Thomas Hilpert, Denzlingen; Stefan Mueller, Freiburg, both of Germany

[73] Assignee: Deutsche ITT Industries, GmbH, Freiburg, Germany

[21] Appl. No.: 08/805,767

[22] Filed: Feb. 25, 1997

[30] Foreign Application Priority Data

Feb. 27, 1996 [EP] European Pat. Off. .............. 96102902

[51] Int. Cl.[6] ........................................ H04N 7/08

[52] U.S. Cl. .......................... 348/484; 348/738; 348/473

[58] Field of Search .................................. 348/473, 484, 348/738, 180, 554, 555, 558, 485

[56] References Cited

U.S. PATENT DOCUMENTS

| | | | |
|---|---|---|---|
| 4,685,065 | 8/1987 | Braun et al. | 348/185 |
| 4,933,768 | 6/1990 | Ishikawa et al. | 348/738 |
| 5,072,297 | 12/1991 | Kanazawa et al. | 348/738 |
| 5,268,712 | 12/1993 | Hilpert et al. | 348/738 |
| 5,298,996 | 3/1994 | Stelling | 348/180 |
| 5,355,162 | 10/1994 | Yazolino et al. | 348/555 |
| 5,467,141 | 11/1995 | Ligertwood | 348/555 |
| 5,570,134 | 10/1996 | Hong | 348/558 |
| 5,596,364 | 1/1997 | Wolf et al. | 348/180 |
| 5,663,768 | 9/1997 | Yang | 348/558 |
| 5,673,088 | 9/1997 | Nah | 348/738 |

FOREIGN PATENT DOCUMENTS

| | | |
|---|---|---|
| 0374996 | 11/1989 | European Pat. Off. . |
| 0653857A1 | 5/1995 | European Pat. Off. . |
| 2716056 | 2/1994 | France . |
| WO8503824 | 8/1995 | WIPO . |

OTHER PUBLICATIONS

European Search Report for 96102902.2 dated Aug. 29, 1996.

*Primary Examiner*—Victor R. Kostak
*Attorney, Agent, or Firm*—Arthur L. Plevy

[57] ABSTRACT

A circuit for decoding additional information in a composite signal, the circuit having a filter device for separating a signal range in the composite signal, which includes the additional information in coded form. An adaptive decoding device is controlled by a signal quality parameter which is determined in an additional circuit from the respective reception state of the composite signal.

20 Claims, 2 Drawing Sheets

CIRCUIT FOR DECODING ADDITIONAL INFORMATION IN A COMPOSITE SIGNAL

FIELD OF THE INVENTION

The present invention relates to a circuit for decoding additional information in a composite signal.

BACKGROUND OF THE INVENTION

Circuits for decoding additional information in a composite signal serve to recover additional information from received signals in audio or video consumer equipment. As a rule, the additional information represents auxiliary information which makes it easier for the user to operate the respective receiver. For a car driver, for example, the identification of a receiver station as a traffic information station represents important information. Similar additional information is contained in television signals, which include digital information as to whether the respective sound channel is a mono signal, a stereo signal, or a multichannel sound signal.

Via additional carriers or by multiplexing existing carriers, this information is inserted as an AM or FM signal into the existing composite signal. Decoding this additional information is generally simple and can be readily implemented with conventional analog circuits or, after analog-to-digital conversion, with conventional digital circuits. However, the rapid changes of such additional information and the continual introduction of new additional information present difficulties, because under certain circumstances the switchovers controlled by the additional information are greatly disturbed by adjacent channels and poor receiving conditions and result in misinterpretations of the additional information.

It is therefore an object of the invention to provide a circuit for decoding such additional information included in a composite signal which is less susceptible to noise and spurious effects.

SUMMARY

The invention is directed to a circuit for decoding additional information in a composite signal. The circuit comprises a filter device for separating a signal range in the composite signal, which contains the additional information in coded form; an adaptive decoding device which decodes the additional information from the separated signal range taking into account a signal quality parameter; and a signal quality monitor device for determining the signal quality parameter from the respective reception state of the composite signal.

The invention has the advantage that existing circuit concepts can be used and that the improvements are achieved via simple additional circuits. Since the signal processing is generally purely digital, it is immaterial for the processing whether additional circuits are used for the additional functions or whether the additional functions are implemented via additional program steps using existing processors. In that case it is only necessary to modify the program.

The signal quality parameter, which is a measure of the quality of the received signal, can be determined at different points of the composite signal. That depends on the type of the respective composite signal, of course. Digital processing has the advantage that the signals are generally present as normalized signals whose range of values lies between −1 and +1. Such a quality value can then be easily determined via the defined levels of the carriers and their noise-induced amplitude variations.

If the signal spectrum includes ranges in which no signal should be present, the general noise or a spurious external signal can advantageously be determined by a level measurement in this range. Such signal ranges are found particularly in the above-mentioned composite signals in consumer equipment because there the individual signal ranges generally do not overlap for compatibility reasons. As a rule, the individual types of information are linked with different carriers which are arranged in the frequency spectrum in such a way that their modulation ranges do not overlap. In the intermediate ranges, no signal should be present in the presence of a regular signal or under good receiving conditions. By determining the respective noise value in these ranges, a signal quality parameter can be determined, e.g., by complementation or formation of quotients.

With the signal quality parameter, individual or all parameters can be weighted and/or associated switching thresholds can be changed in the decoding device. In this manner, a previously rigid decoding device is adapted to the receiving conditions.

The improved evaluation of the additional information has the advantage that the amount of filter circuitry required can remain relatively small. The increased reliability of the evaluation of the disturbed additional information does not result from a higher quality factor of the filters. This is possible because it is the spurious component which is measured and evaluated, not the desired signal component. Determining a relatively large spurious component—a small spurious component is of no interest, since it does not cause incorrect decoding—generally does not require any narrowband filters. The desired signal range can therefore be eliminated with simple notch or bandpass filters whose reject region is positioned so as to largely suppress the respective desired or additional signal.

BRIEF DESCRIPTION OF THE DRAWINGS

The invention and further advantageous features will not be explained in more detail with reference to the accompanying drawings, in which.

DETAILED DESCRIPTION OF THE INVENTION

Figure 1:
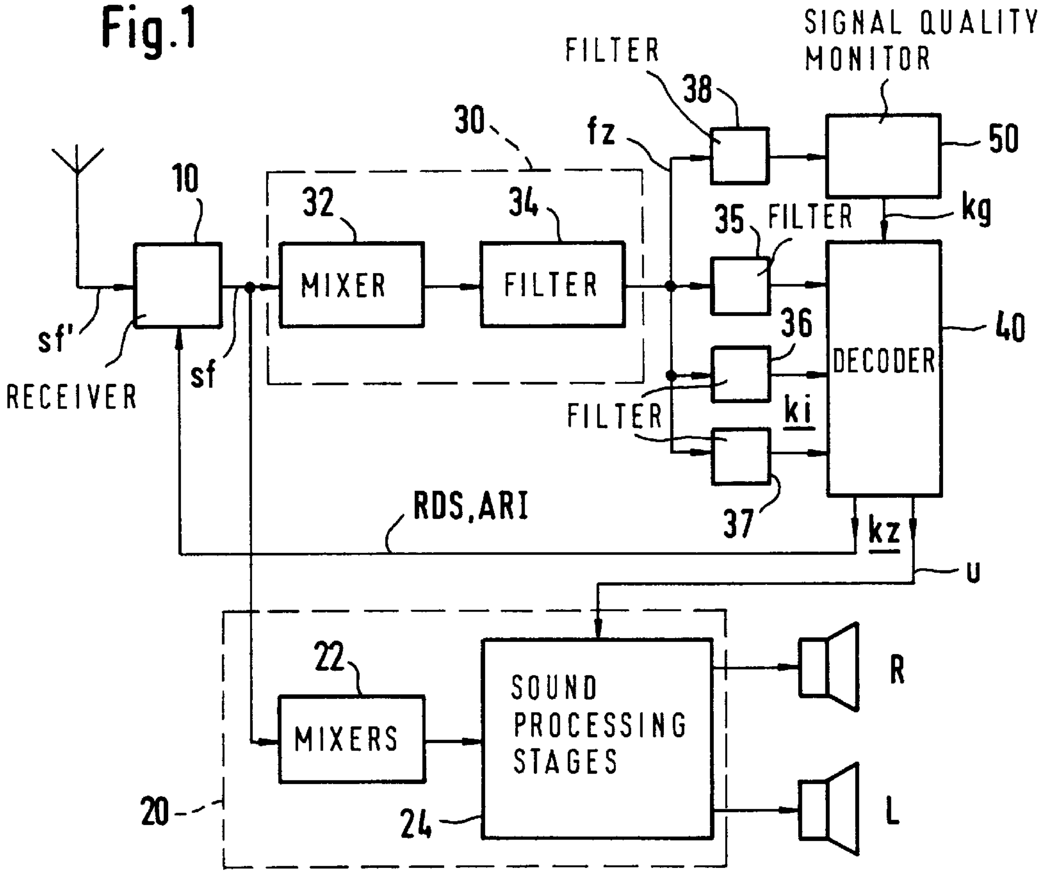
FIG. 1 is a block diagram of one embodiment of the invention for decoding an additional function in a stereo multiplex signal.

The block diagram FIG. 1 shows a receiving device 10 for a composite signal sf', which in this embodiment, is a stereo multiplex signal. In the receiving device 10, the radio-frequency composite signal is transformed into the baseband, shown schematically in FIG. 2. The composite signal sf at baseband is digitized and fed to a sound-signal-processing device 20, which generates the desired output signals R, L by means of mixers 22 and sound-processing stages 24. The signals sf are also fed to a mixer device 32 and a filter device 34 of a preprocessing stage 30, which converts additional information fz in the composite signal sf to a lower frequency, particularly to a baseband frequency.

If the additional information fz at 57 kHz is transformed into the baseband, individual components ki can be separated from each other by means of simple filter devices 35, 36, 37. The separated components ki are then fed to a decoding device 40 to form the individual identification signals kz, such as a mono/stereo switching signal u or an ARI (Auto Radio Information) identification signal, which are fed to the sound-processing stage 24 or the receiving device 10, respectively.

To separate the individual components ki in the filter device 34 or in the low-pass or bandpass filters 35, 36, 37, the processing frequencies are lowered by means of decimators in order to reduce the amount of circuitry required for the filters. A signal-free frequency signal is separated from the signal fz by means of a bandpass filter 38 to determine a signal quality parameter kg therefrom by means of a signal quality monitor device 50. The signal-free frequency signal is placed in the signal with information content. The amplitude of this signal is proportional to the amplitude of the entire received signal fz. Thus, the threshold of the decoding device 40 is set higher or lower, as a function of the processed reference frequency signal. In other words, the signal quality monitor device sets the operating threshold of the decoding device 40 by generating the signal quality parameter (kg). Thus, the decoding device 40 adapts itself to the respective receiving conditions.

Figure 2:
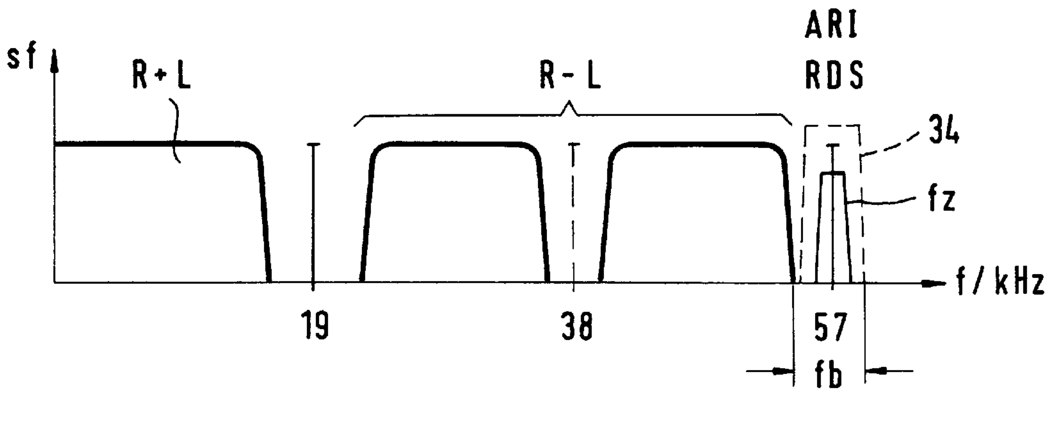
FIG. 2 shows the associated frequency scheme.

FIG. 2 illustrates the frequency scheme of the stereo multiplex signal sf which includes a subcarrier at 57 kHz which is modulated with additional information fz, such as an ARI identification signal. The invention can also be used to increase the reliability of a pilot signal detection at 19 kHz, so that automatic stereo switching will be less disturbed.

Figure 3:
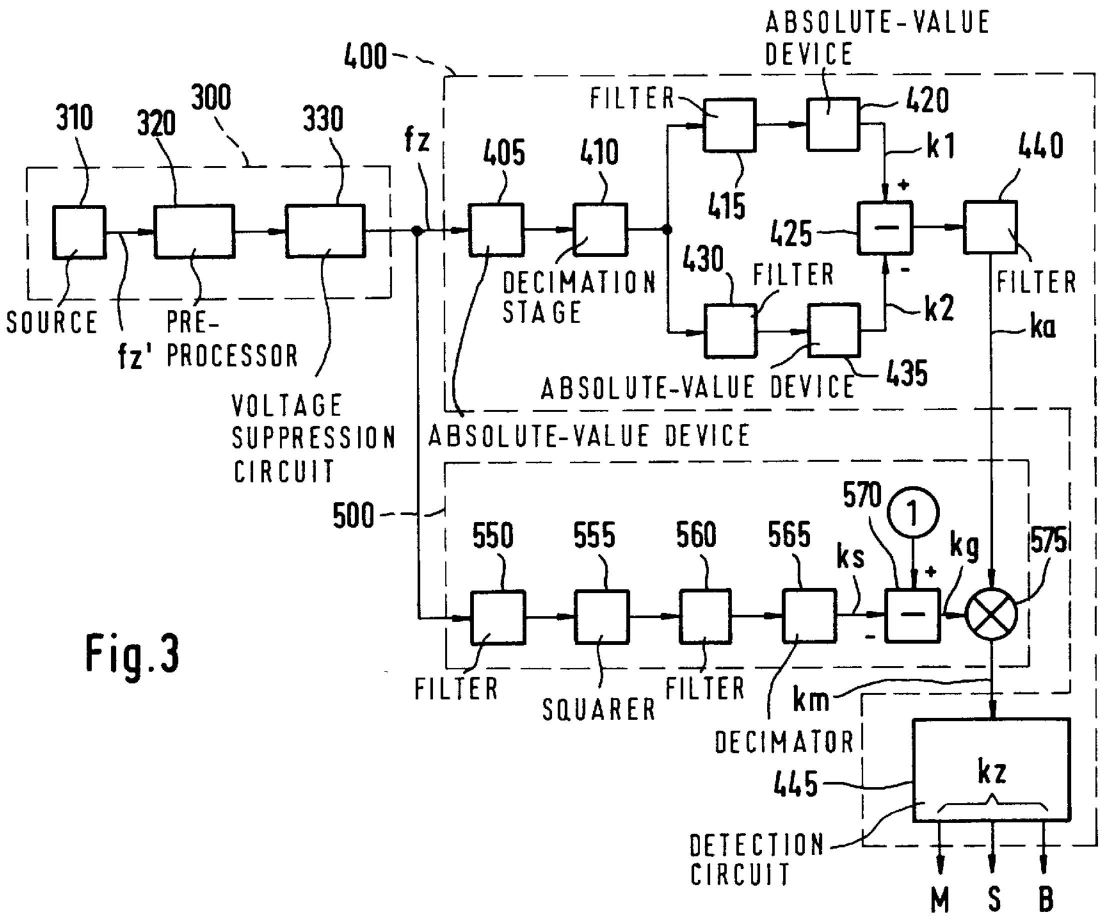
FIG. 3 is a block diagram of a further embodiment of the invention.

FIG. 3 shows the essential functional units of a further embodiment of the invention. The composite signal sf (see FIG. 4) is a standard television signal with a first sound carrier FM1 and a second sound carrier FM2, the sound carrier FM2 containing additional information fz' about an AM modulation. Since the additional information fz' is located in the range of the carrier FM2, the preceding processing stages for prefiltering and frequency conversion have been omitted in FIG. 3 for the sake of clarity; instead, a source 310 for this preprocessed signal fz' is shown in a preprocessing stage 300. Thus, in the output signal fz' of this source, the carrier FM2 is located not at 54 kHz, but at a lower frequency, e.g., between 8 kHz and 10 kHz. The video signal, the R+L carrier FM2 are no longer present or are only present as residues. The output signal fz' of the source 310 thus, contains only the carrier FM2 and possibly a frequency line k1 as the upper sideband, removed from the carrier by 171.5 Hz, or a frequency line k2 as the lower sideband, removed from the carrier by 274.1 kHz. These two frequency lines are used to encode whether the respective audio channel contains a stereo signal or a bilingual signal. If none of the frequency lines k1, k2 is present, i.e., if the carrier FM2 is not amplitude-modulated, this information serves as an identification that the respective audio channel contains only a mono signal. The difficulties during decoding arise if separation is rendered difficult by receiving disturbances or external signals. A certain remedy is provided by narrowband filters for the identification signals k1, k2, but despite the increased complexity, the result remains unsatisfactory.

The source 310 is followed by a preprocessing device 320 for the additional-information range fb (see FIG. 4), which essentially contains a decimator with a decimating filter. Any DC voltage components are suppressed by a DC voltage suppression circuit 330. The filtered additional signal fz is fed to an adaptive decoding device 400, whose output provides the desired identification signals M, S, B for the mono, stereo or bilingual mode.

The adaptive decoding device 400 includes an input stage containing an absolute-value device 405 for demodulating the AM-modulated signal fz, which is followed by a decimation stage 410 with which the clock frequency is reduced from 32 kHz to 2 kHz. The amplitude of the signal k1 at 171 Hz is determined by means of a bandpass filter 415 and an absolute-value device 420, and fed to a minuend input of a subtracter 425. The amplitude of the signal k2 at 274 Hz is determined by means of a bandpass filter 430 and an absolute-value device 435, and fed to a subtrahend input of the substracter 425. From the difference, a resulting parameter ka is formed by means of a low-pass filter 440. Via respective switching thresholds, the required identifying signals kz or M, S, B, can be determined from this parameter ka in the same way as in a nonadaptive decoding device. For example, a range of values from +0.2 to +1 may correspond to the stereo identification signal S, a range from −0.2 to +0.2 to the mono identification signal M, and a range from −1 to −0.2 to the bilingual-sound identification signal B. According to the invention, however, the resulting parameter ka is modified by means of the signal quality parameter kg. The switching thresholds for the modified parameter km are set by a threshold detection circuit 445. The threshold level may be identical to that in a nonadaptive circuit.

The additional circuit 500, with which the adaptive control according to the invention is made possible, includes an input stage containing a bandpass filter 550 which receives the filtered additional signal fz. The midfrequency of this filter will advantageously be chosen so that the lower skirt will not or only slightly cover the carrier FM2 with the firt or second identification signal k1, k2, (see FIG. 5). The higher frequency components should pass through the filter with as little attenuation as possible. Therefore, the upper skirt of the preceding filter 320 must not be too close to the carrier FM2, because otherwise, the filter 320 would suppress these frequencies and the bandpass filter 550 would no longer be supplied with a frequency range to be evaluated.

The noise- or spurious-signal components at an output of the bandpass filter 550 are rectified by means of a squarer 555. The squaring also causes the measured signal values to be weighted. A digital low-pass filter 560 smooths the signal waveform, and a decimator 565 reduces the clock frequency from 32 kHz to 2 kHz. The output signal of the decimator 565 corresponds to an interference parameter ks lying between the values 0 and +1 which increases or decreases in proportion to the measured interference content. By means of a subtracter 570, the signal quality parameter kg is formed by subtracting the interference parameter ks from the numerical value +1.

The adaptive action of the signal quality parameter kg on the original parameter ka is effected by means of a multiplier 575, whose output is a modified or adaptive parameter km which is applied to the threshold detection device 445 to obtain the desired identification signals kz or M, S, B.

If no spurious signals are present, the signal quality parameter kg will assume the value +1, whereby the original parameter ka is not changed. If, however, the noise component in the filtered additional signal fz increases, the signal quality parameter kg will decrease, e.g., to a value of 0.5. The value of the original parameters ka is thus halved, whereby the tendency for the mono identification signal M is increased. Thus, individual signal“outliers”, which are caused by noise or external signals, e.g., in the mono mode or during reception of a signal without the carrier FM2, are prevented from wrongly switching the receiver. This is particularly important for reliable mono operation if the received signal contains neither a stereo signal nor a bilingual signal. Under poor receiving conditions, automatic switching is only possible in the presence of unambiguous identification signals k1, k2, or ka.

The digital low-pass filter 560 may also contain nonlinear stage or counters which are charged or discharged differently to further improve the noise suppression.

Figure 4:
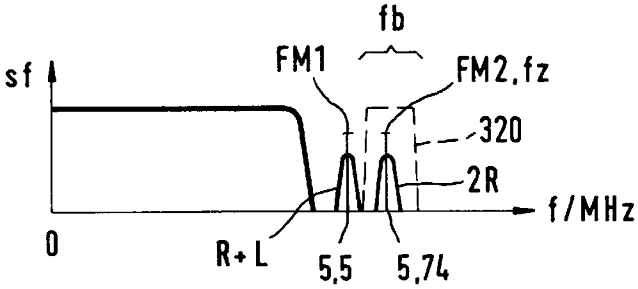
FIGS. 4 and 5 show respective associated frequency schemes.

FIG. 4 shows the frequency scheme of a standard television signal sf. The video signal range from 0 Hz to about 5 MHz is followed by the frequency-modulated audio signal range with the first carrier FM1 at 5.5 MHz. In this range, the R+L information of a stereo signal is transmitted, which also represents the mono signal. In the case of multichannel sound transmission, this range contains the first sound signal. The second carrier FM2, which contains the 2R signal or the second sound signal in frequency-modulated form, is located at 5.74 MHz. From the R+L signal and the 2R signal, the R and L signals are formed by means of a stereo matrix, as is well known. However, there are many television transmitters which do not yet transmit this second carrier FM2. The additional identification with respect to mono, stereo, or multichannel sound operation is superposed on the carrier FM2 by conventional amplitude modulation, which takes place at a very low frequency rate and is thus inaudible.

Figure 5:
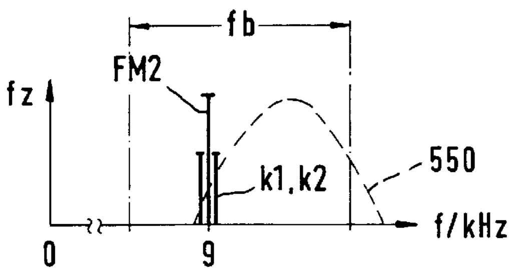

FIG. 5 shows the frequency scheme of the signals fz after the preprocessing stage 300. To permit digital signal processing at 32 kHz, the carrier FM2 was converted in the stage 300 from 54 kHz to 9 kHz. The signal fz now contains no audio information whatsoever, but only the carrier FM2, which may be amplitude-modulated. The upper and lower sidebands contain either the frequency line k1 or the frequency line k2. Both are located close to the carrier FM2, as indicated. The signal range fb, which was separated in the preprocessing stage 300 and is to contain the additional information fz and a signal-free range of the composite signal sf, is shown schematically. The associated passband of the bandpass filter 550 is indicated by the broken line 550, which covers essentially the signal-free range in the separated signal range fb. It is of no consequence if a small portion of the carrier FM2 is also covered. It also makes no difference how far the passband exceeds the separated signal range fb if it is ensured that no signal components are present there. As a result, the requirements to be placed on the filter 550 are very low, so that the filter can be easily implemented by digital means.

It should be understood that the embodiments described herein are merely exemplary and that a person skilled in the art may make many variations and modifications to the embodiments utilizing fuinctionally equivalent elements to those described herein. Any and all such variations or modifications as well as others which may become apparent to those skilled in the art, are intended to be included within the scope of the invention as defined by the appended claims.

What is claimed is:

1. A circuit for decoding additional information in a composite signal, comprising:

filter means for separating a signal range in the composite signal, which contains the additional information in a coded form;

adaptive decoding means for decoding the additional information from the separated signal range taking into account a signal quality parameter indicative of whether said composite signal can be properly received; and signal quality monitor means for determining the signal quality parameter from a reception state of the composite signal.

2. The circuit according to claim 1, wherein the separated signal range comprises a signal-free content of the composite signal.

3. The circuit according to claim 1, wherein when the signal quality monitor means operates to determine the signal quality parameter, one of a noise-signal and external-signal value is determnined.

4. The circuit according to claim 1, wherein the signal quality parameter is used so that one of at least one parameter and at least one switching threshold is modified in the adaptive decoding means.

5. A circuit for decoding additional information in a composite signal, comprising:

filter means for separating a signal range in the composite signal, which contains the additional information in a coded form;

adaptive decoding means for decoding the additional information from the separated signal range taking into account a signal quality parameter; and signal quality monitor means for determining the signal quality parameter from a reception state of the composite signal;

wherein the signal quality parameter is used so that at least one parameter and at least one switching threshold are modified in the adaptive decoding means.

6. The circuit according to claim 3, further comprising second filter means having a bandpass which lies, at least partially, in the separated signal range and a reject band for suppressing the additional information, the second filter means being operative for determining one of the noise-signal and external-signal value.

7. The circuit according to claim 6, wherein the second filter means comprises one of a notch filter and a bandpass filter.

8. The circuit according to claim 6, further comprising means for squaring and low-pass filtering an output of the second filter means, and substracter means for further processing the squared and low-pass filtered output of the second filter means, wherein the output of the second filter means represents an interference parameter which is subtracted from a numerical value +1 by means of the substracter means, the substracter means producing an output value which comprises the signal quality parameter.

9. The circuit according to claim 4, wherein the adaptive decoding means multiplies the at least one parameter by the signal quality parameter.

10. A circuit for decoding additional information in a composite signal, comprising:

a filter for separating a signal range in the composite signal, the signal range containing the additional information in a coded form;

a signal quality monitor coupled to the filter, for determining a signal quality parameter indicative of whether said composite signal can be properly received from a reception state of the composite signal; and an adaptive decoder coupled to the signal quality monitor, the adaptive decoder using the signal quality parameter to decode the additional information from the separated signal range taking.

11. The circuit according to claim 10, wherein the separated signal range comprises a signal-free content of the composite signal.

12. The circuit according to claim 10, wherein the signal quality parameter is used so that at least one parameter and at least one switching threshold are modified in the adaptive decoder.

13. A circuit for decoding additional information in a composite signal, comprising:

a filter for separating a signal range in the composite signal, the signal range containing the additional information in a coded form;

a signal quality monitor coupled to the filter, for determining a signal quality parameter from a reception state of the composite signal; and, an adaptive decoder coupled to the signal quality monitor, the adaptive decoder using the signal quality parameter to decode the additional information from the separated signal range taking;

wherein the signal quality monitor determines one of a noise-signal and external-signal value in determining the signal quality parameter.

14. The circuit according to claim 13, further comprising a second filter having a bandpass which lies, at least partially, in the separated signal range and a reject band for suppressing the additional information, the second filter being operative for determining one of the noise-signal and external signal-value.

15. The circuit according to claim 14, wherein the second filter comprises one of a notch filter and a bandpass filter.

16. The circuit according to claim 14, further comprising a squarer coupled to a low-pass filter for squaring and filtering an output of the second filter, and a substracter for further processing the squared and filtered output of the second filter, wherein the output of the second filter represents an interference parameter which is subtracted from a numerical value +1 by the substracter, the substracter producing an output value which comprises the signal quality parameter.

17. The circuit according to claim 12, wherein the adaptive decoder multiplies the at least one parameter by the signal quality parameter.

18. The circuit according to claim 1, wherein the composite signal comprises a stereo multiplex signal.

19. The circuit according to claim 1, wherein the composite signal comprises a television signal.

20. A circuit for decoding additional information in a composite signal, comprising:

a filter for separating a signal range in the composite signal, the signal range containing the additional information in a coded form;

a signal quality monitor coupled to the filter, for determining a signal quality parameter from a reception state of the composite signal; and, an adaptive decoder coupled to the signal quality monitor, the adaptive decoder using the signal quality parameter to decode the additional information from the separated signal range taking;

wherein the signal quality parameter is used so that at least one of at least one parameter and at least one switching threshold is modified in the adaptive decoder.

* * * * *